United States Patent [19]

Borgiani

[11] 4,229,240
[45] Oct. 21, 1980

[54] METHOD OF MAKING SIMULATED TUFTED SEAT CUSHION

[75] Inventor: Olivio Borgiani, Toronto, Canada

[73] Assignee: Electrolux Corporation, Old Greenwich, Conn.

[21] Appl. No.: 877,216

[22] Filed: Feb. 13, 1978

[51] Int. Cl.³ .................. A47C 27/14; B29C 17/04
[52] U.S. Cl. ........................... 156/214; 5/480; 156/290; 156/291; 267/143
[58] Field of Search ............. 156/81, 72, 252, 253, 156/290, 291, 214, 213; 5/356

[56] References Cited

U.S. PATENT DOCUMENTS

| | | | |
|---|---|---|---|
| 3,072,520 | 1/1963 | Groth | 156/213 |
| 3,083,495 | 4/1963 | Quakenbush | 5/356 |
| 3,122,465 | 2/1964 | Keller et al. | 156/253 |
| 3,998,684 | 12/1976 | McRight | 156/291 |
| 4,040,881 | 8/1977 | Wallace | 156/290 |
| 4,056,858 | 11/1977 | Weber | 156/290 |

Primary Examiner—Caleb Weston
Attorney, Agent, or Firm—William S. Henry

[57] ABSTRACT

In accordance with the present invention, there is provided an improved, simulated tufted cushion and method of making the same which involves simultaneously forming the tufts with simulated buttons and creases between tufts in a single operation in a heated press.

4 Claims, 6 Drawing Figures

METHOD OF MAKING SIMULATED TUFTED SEAT CUSHION

SUMMARY OF THE INVENTION

The present invention involves first placing a sheet of reinforced vinyl on the lower platen of a press. On this sheet is placed a foam rubber pad of the size and shape of the desired cushion, which pad has been formed with openings therethrough at the desired locations of the tufts. One or more discs of latex, vinyl foam or acetate, or a combination of such discs, are then placed in each opening, the thickness of the disc, or plurality of discs, in each opening being substantially less than the thickness of the foam rubber pad. Finally, a sheet of expanded vinyl, the upper surface of which has been processed in well-known manner to have a pleasing appearance, such as that of leather, is placed over the pad. The upper platen of the press is provided with tooling comprising hollow vertical cylinders of a length less than the thickness of the pad, which are located in alignment with the openings through the latter. Adjacent cylinders are preferably connected by straight bars, thus forming a grid. When the press is closed by the application of substantial force to the upper platen and the grid is heated thermoelectrically, the cylinders force the material of the upper vinyl sheet into the openings in the pad and the heat causes the discs in the opening to seal to both the lower and upper vinyl sheets. At the same time, the heated bars extending between the hollow cylinders form creases in the upper vinyl sheet. When the press is opened, the upper vinyl sheet is held down in the openings and the lower vinyl sheet is drawn up into the openings by reason of the sheets being sealed together in the openings by the discs. This gives the appearance of the upper sheet being tufted, the tufts formed by the cylinders being connected by the grooves formed by the bars. The fact that the cylinders of the tooling are hollow results in the formation of what appears to be a button at the bottom of each tuft.

DESCRIPTION OF THE FIGURES

The invention will now be described with reference to the accompanying drawings which show a preferred form thereof and wherein.

Figure 1:
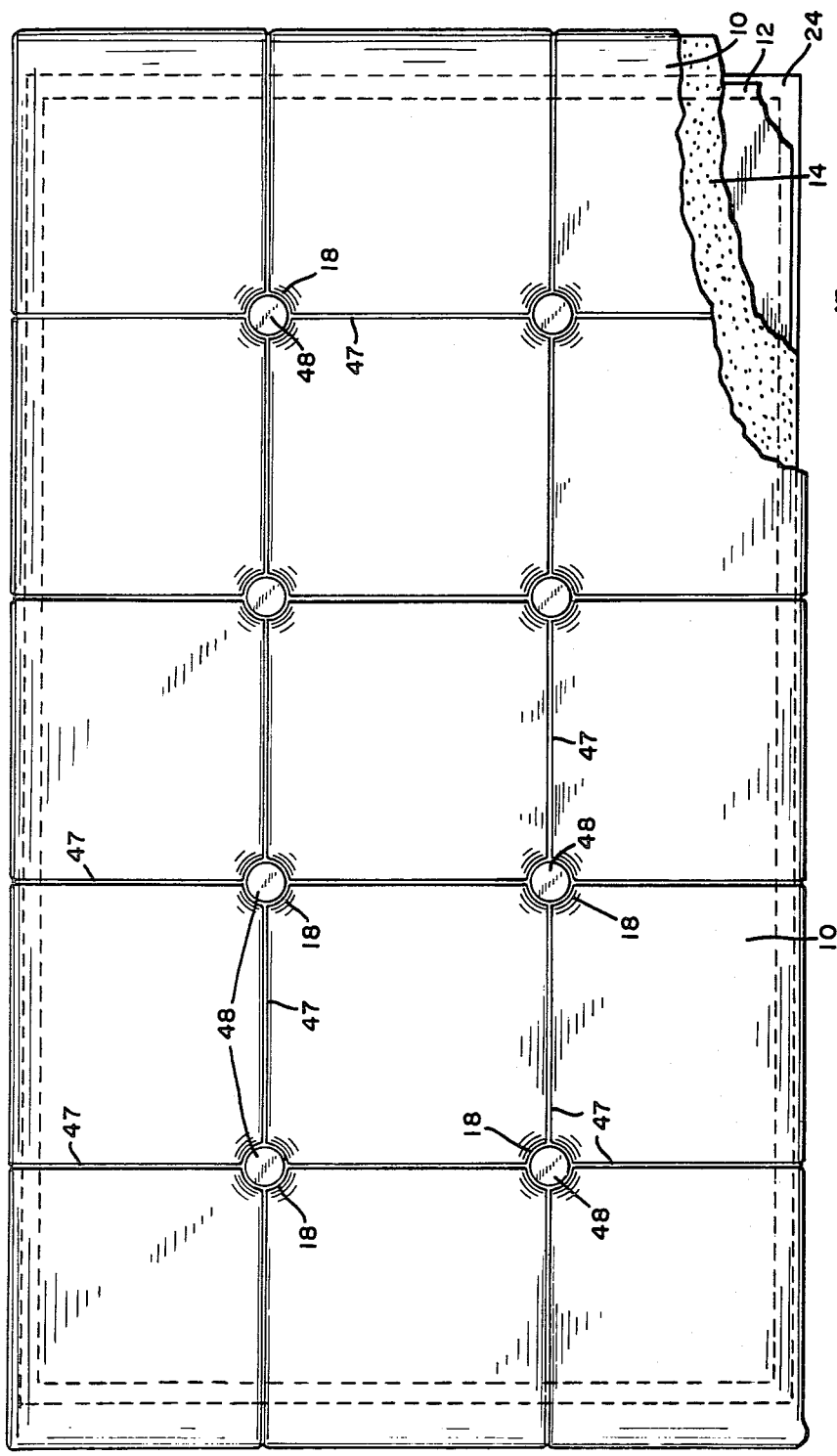
FIG. 1 is a top view of a seat cushion or the like in accordance with the invention.
Figure 2:
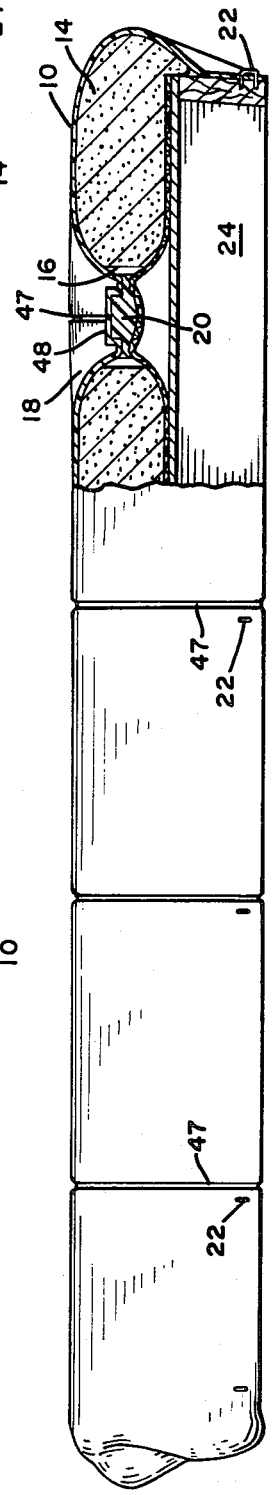
FIG. 2 is a side view, partially in cross-section, of the cushion shown in FIG. 1.
Figure 3:
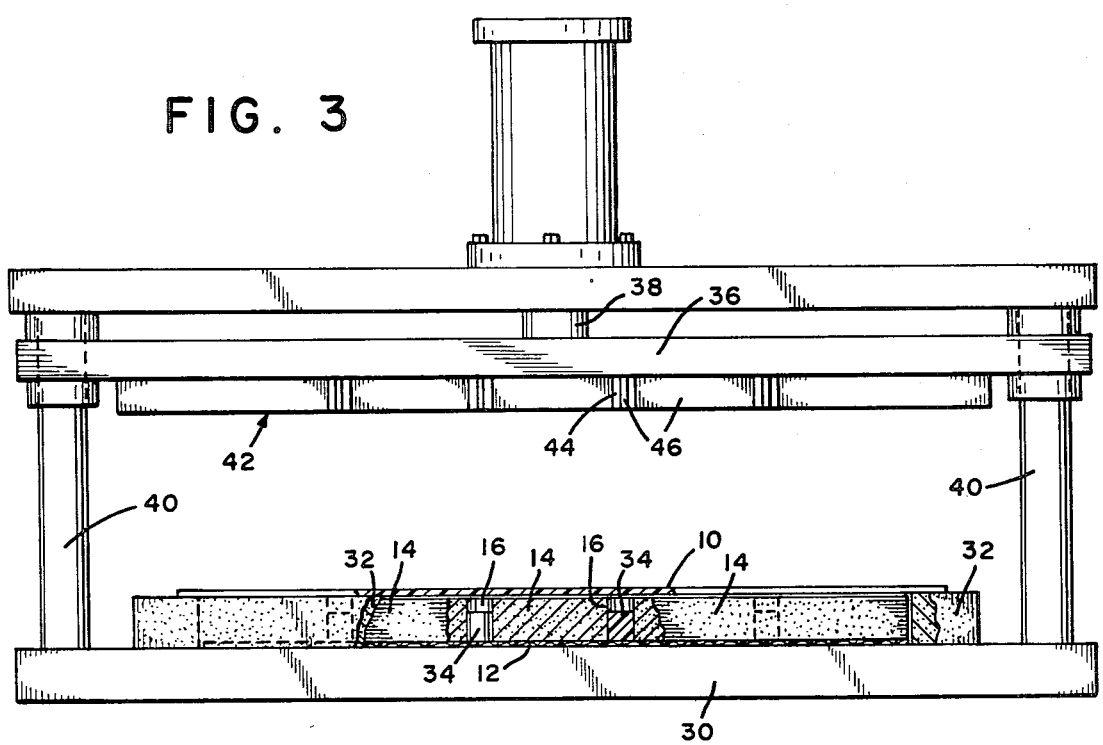
FIG. 3 is a cross-sectional view of a press suitable for making the cushion shown in FIGS. 1 and 2, the press being in open position and loaded with the components necessary to produce the cushion.

Referring to the drawings, and particularly FIGS. 1 and 2 thereof, reference character 10 designates a sheet of expanded vinyl, the upper surface of which preferably has been processed in well-known manner to have an attractive appearance, such as that of leather, and which constitutes the upper exposed surface of the cushion. The lower surface is formed by a sheet 12 of reinforced vinyl. Enclosed between the two sheets is a pad of foam rubber 14 which has been provided with holes 16 at the locations where tufts 18 in the cushion are desired. The upper and lower sheets are drawn into holes 16 and secured together by being fused to a body 20 of latex, vinyl foam, or acetate. As shown more particularly in FIG. 2, the dimensions of upper sheet 10 are greater than those of the finished cushion, and the overhang is folded down around the edges of the pad 14 and secured as by staples 22 to the inner sides of a frame 24 of wood.

The method of making the cushion shown in FIGS. 1 and 2 will be explained by reference to FIGS. 3 through 6, wherein reference character 30 designates the lower platen of a heated press. Secured to platen 30 is a rectangular fixture 32, which may be of foam rubber but forms no part of the cushion. As shown particularly in FIG. 3, the sheet 12 of reinforced vinyl is placed on platen 30 within fixture 32, and the pad 14 of foam rubber formed with openings 16 therethrough is placed on sheet 12. One or more plugs or discs 34 of latex or acetate, or a combination of such discs, are placed in holes 16, and finally sheet 10 of expanded vinyl is placed over pad 14. Sheet 10 is larger than pad 14 and the excess material extends out over fixture 32.

The upper movable platen 36 of the press is mounted on piston rod 38 and is guided by fixed vertical rods 40. Platen 36 carries tooling 42 which is shown in perspective in FIG. 6 and which comprises a grid made up of hollow cylinders 44 between which extend bars 46. The cylinders are spaced so as to be in alignment with the holes 16 in pad 14 and the vertical dimension of cylinders 44 and bars 46 is less than the thickness of pad 14.

Figure 4:
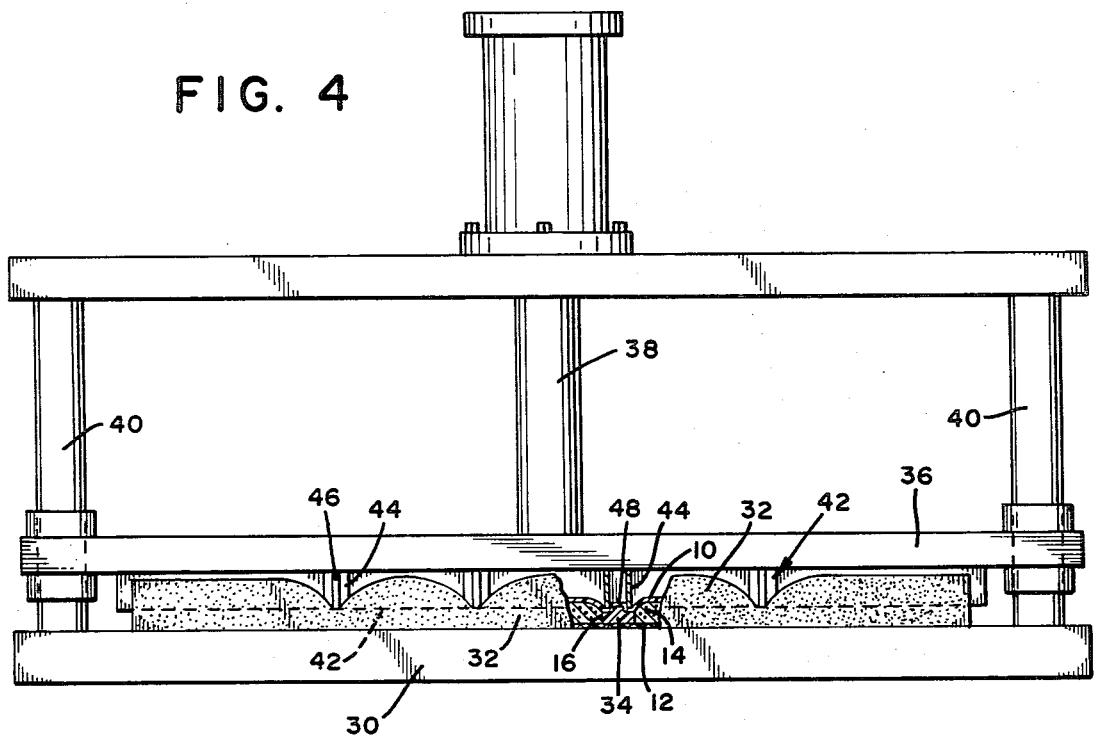
FIG. 4 is a similar view of the press shown in FIG. 3, but in closed position.
Figure 5:
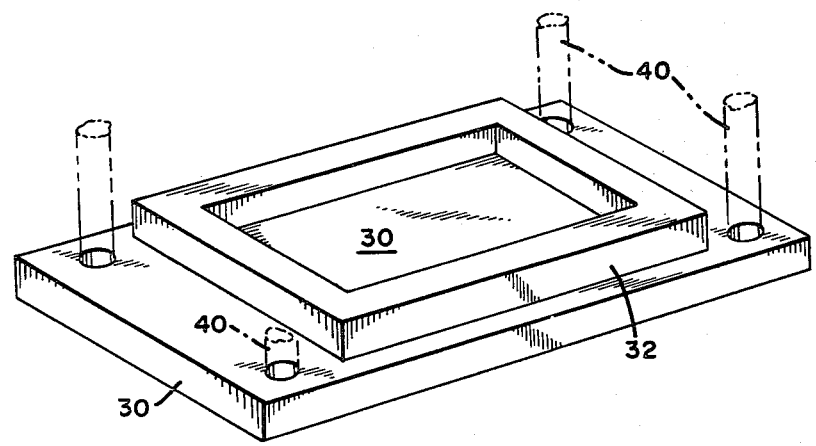
FIG. 5 is a perspective view of the lower platen of the press.
Figure 6:
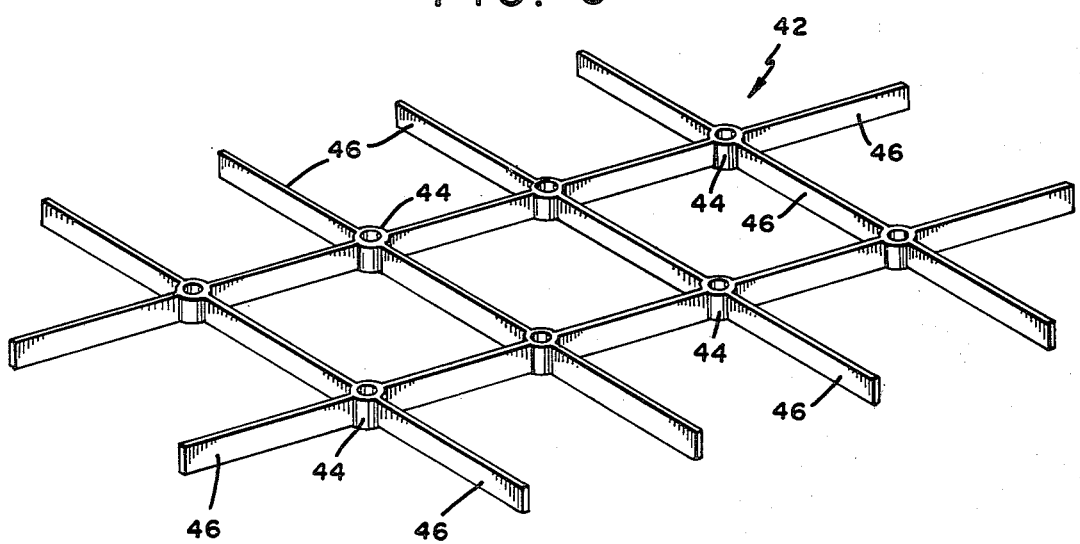
FIG. 6 is a perspective view of the tooling secured to the upper platen of the press.

When the press has been loaded, as above described, the upper platen is moved downwardly by preferably hydraulic or pneumatic force applied through piston rod 38 until it reaches the closed position shown in FIG. 4. In this position the hollow cylinders 44 have entered the openings 16 in pad 14 and have drawn the upper sheet 10 into the openings and against the discs 34 therein. At the same time the bars 46 have pressed the upper sheet 10 downwardly where it lies directly beneath them by displacing the underlying pad 14 to form creases 47 in sheet 10.

After the press has been held closed for approximately 5 seconds, the grid is rapidly heated by passing a high frequency electrical charge from the upper platen through the grid to the lower platen, which is grounded. This fuses the discs 34 within openings 16 to both the lower sheet 12 and the upper sheet 10. Because the cylinders 44 are hollow, the material of the upper sheet expands upwardly thereinto to form circular raised portions 48 which simulate buttons. Heat applied by the bars 46 causes the creases 47 to become permanent. After about 4 seconds of heating, the electrical heating of the platens is discontinued and they are allowed to cool for about 6 seconds before the press is opened by lifting the upper platen.

When the pressure exerted by the upper platen is relieved, the lower sheet where it is fused to the discs 20 is drawn part way up into openings 16 in pad 14, and the upper sheet 10 continues to extend part way down into the openings by virtue of its being fused to the discs so as to form the depressions shown in cross-section in FIG. 2. As above explained, the upper sheet has simulated buttons 48 at the bottom of these depressions, and the latter are joined by the permanently impressed creases 47, the result being a simulated tufted cushion.

I claim:

1. An improvement in the method of making a simulated tufted cushion, which comprises:
   (a) forming discrete spaced openings extending through a foam rubber pad;
   (b) placing said pad on a lower sheet of plastic material, said sheet being disposed so as to have its entire upper surface in a single horizontal plane such that said extended openings remain available for filling;
   (c) substantially filling said openings from said horizontal plane upwardly with discrete plugs of fusible material;
   (d) placing an upper sheet of plastic material over said pad;
   (e) applying pressure selectively to said upper sheet so as to draw the upper sheet down into the openings containing said plugs of material, thereby to give the appearance of tufts;
   (f) heating selectively in at least said openings so as to fuse both of said sheets to the fusible material; and
   (g) providing tooling in the form of a grid with spaced hollow cylinders for insertion into said openings, said cylinders being connected by coordinate bars.

2. The method as defined in claim 1, in which the thickness of said hollow cylinders and said coordinate bars is less than the thickness of said pad.

3. The method as defined in claim 1, in which said hollow cylinders cause raised circular portions to be permanently impressed in said upper sheet when said sheet is drawn into said openings, thereby to simulate buttons at the bottom of said tufts.

4. The method as defined in claim 3, in which pressure and heat are applied to said upper sheet along said coordinate bars so as to produce creases in said upper sheet connecting said tufts.

* * * * *